(12) United States Patent
Rabinovich et al.

(10) Patent No.: US 11,120,351 B2
(45) Date of Patent: Sep. 14, 2021

(54) GENERIC TERM WEIGHTING BASED ON QUERY PERFORMANCE PREDICTION

(71) Applicant: International Business Machines Corporation, Armonk, NY (US)

(72) Inventors: Ella Rabinovich, Haifa (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 14/859,387

(22) Filed: Sep. 21, 2015

(65) Prior Publication Data
US 2017/0083568 A1 Mar. 23, 2017

(51) Int. Cl.
*G06N 7/00* (2006.01)
*G06F 16/2453* (2019.01)
*G06F 16/22* (2019.01)

(52) U.S. Cl.
CPC ......... *G06N 7/005* (2013.01); *G06F 16/2272* (2019.01); *G06F 16/24534* (2019.01)

(58) Field of Classification Search
CPC .............. G06N 7/005; G06F 17/30336; G06F 17/30448
See application file for complete search history.

(56) References Cited

U.S. PATENT DOCUMENTS

| | | | |
|---|---|---|---|
| 7,925,644 B2 | 4/2011 | Lin et al. | |
| 8,090,680 B2* | 1/2012 | Smeaton | G06F 16/3326 707/608 |
| 8,280,900 B2* | 10/2012 | Pickens | G06F 16/3326 707/765 |
| 8,290,975 B2* | 10/2012 | Gao | G06F 16/3322 707/767 |
| 8,326,861 B1* | 12/2012 | Ainslie | G06F 16/335 707/768 |
| 9,286,396 B2* | 3/2016 | Gao | G06F 16/951 |
| 9,838,348 B2* | 12/2017 | Maarek | H04L 51/22 |
| 2008/0243500 A1* | 10/2008 | Bisani | G06F 17/2715 704/235 |
| 2009/0319509 A1* | 12/2009 | Smeaton | G06F 16/3326 |
| 2010/0121840 A1* | 5/2010 | Murdock | G06F 16/3346 707/722 |
| 2011/0066618 A1* | 3/2011 | Sigurbjornsson | G06F 16/9535 707/739 |

(Continued)

OTHER PUBLICATIONS

Amati, et al., "Query Difficulty, Robustness, and Selective Application of Query Expansion", S. McDonald and J. Tait (Eds.): ECIR 2004, LNCS 2997, pp. 127-137, 2004, Copyright Springer-Verlag Berlin Heidelberg 2004.

(Continued)

*Primary Examiner* — Ashish Thomas
*Assistant Examiner* — Abdullah A Daud
(74) *Attorney, Agent, or Firm* — Edward. J. Wixted, III (57) ABSTRACT

The method includes receiving, by one or more processors, an initial query term. The method further includes generating, by one or more processors, an expanded query based on the received initial query term and one or more related terms to the received initial query. The method further includes determining, by one or more processors, weights corresponding to terms in the received initial query term and the generated expanded query term based on a predicted effect on query performance.

15 Claims, 3 Drawing Sheets

(56) References Cited

U.S. PATENT DOCUMENTS

| | | | |
|---|---|---|---|
| 2011/0131157 A1 | 6/2011 | Iyer et al. | |
| 2013/0124492 A1* | 5/2013 | Gao | G06F 40/44 707/706 |
| 2014/0149429 A1* | 5/2014 | Gao | G06F 16/24578 707/749 |
| 2016/0188599 A1* | 6/2016 | Maarek | H04L 51/22 707/728 |
| 2016/0267904 A1* | 9/2016 | Biadsy | G10L 15/08 |
| 2016/0275946 A1* | 9/2016 | Caseiro | G06F 17/2715 |

OTHER PUBLICATIONS

Balasubramanian, et al., "Exploring Reductions for Long Web Queries", SIGIR '10, Jul. 19-23, 2010, Geneva, Switzerland, Copyright 2010 ACM, 8 pages.

Balasubramanian, et al., "Learning to Select Rankers", SIGIR '10, Jul. 19-23, 2010, Geneva, Switzerland, 2 pages.

Bendersky, et al., "Discovering Key Concepts in Verbose Queries", SIGIR '08, Jul. 20-24, 2008, Singapore, Copyright 2008 ACM, 8 pages.

Bendersky, et al., "Effective Query Formulation with Multiple Information Sources", WSDM '12, Feb. 8-12, 2012, Seattle, Washington, Copyright 2012 ACM, 10 pages.

Bendersky, et al., "Learning Concept Importance Using a Weighted Dependence Model", WSDM '10, Feb. 4-6, 2010, New York City, New York, Copyright 2010 ACM, 10 pages.

Bendersky, et al., "Modeling Higher-Order Term Dependencies in Information Retrieval using Query Hypergraphs", SIGIR '12, Aug. 12-16, 2012, Portland, Oregon, Copyright 2012 ACM, 10 pages.

Bendersky, et al., "Parameterized Concept Weighting in Verbose Queries", SIGIR '11, Jul. 24-28, 2011, Beijing, China, Copyright 2011 ACM, 10 pages.

Buckley, Chris, "Why current IR engines fail", Sabir Research, Inc., Gaithersburg, Journal Information Retrieval, vol. 12, Issue 6, Dec. 2009, 5 pages.

Cao, et al, "Selecting Good Expansion Terms for Pseudo-Relevance Feedback", Conference '08, Jul. 20-24, 2008, Singapore, Copyright 2008 ACM, 8 pages.

Carmel, et al., "Estimating the Query Difficulty for Information Retrieval", IEEE, printed Sep. 22, 2015, 3 pages.

Collins-Thompson, et al., "Estimation and Use of Uncertainty in Pseudo-relevance Feedback", SIGIR '07, Jul. 23-27, 2007, Amsterdam, The Netherlands, Copyright 2007 ACM, 8 pages.

Cronen-Townsend, et al., "A Framework for Selective Query Expansion**", CIKM '04, Nov. 8-13, 2004, Washing, DC, ACM, 2 pages.

Lavrenko, et al., "Relevance-Based Language Models: Estimation and Analysis", Center for Intelligent Information Retrieval, Department of Computer Science, University of Massachusetts, printed Sep. 22, 2015, 5 pages.

Liu, et al., "Experiments on Retrieval of Optimal Clusters", Center for Intelligent Information Retrieval, Department of Computer Science, University of Massachusetts, printed Sep. 22, 2015, 8 pages.

Ozdemiray, et al., "Query Performance Prediction for Aspect Weighting in Search Result Diversification", CIKM '14 Proceedings of the 23rd ACM International Conference on Conference on Information and Knowledge Management, 3 pages, 2014.

Ponte, et al., "A Language Modeling Approach to Information Retrieval", copyright 1998 ACM, SIGIR '98, Melbourne, Australia, 7 pages.

Robertson, et al., "The Probabilistic Relevance Framework: BM25 and Beyond", Foundations and Trends in Information Retrieval, vol. 3, No. 4 (2009), pp. 333-389.

Roitman, et al., "Using the Cross-Entropy Method to Re-Rank Search Results", SIGIR '14, Jul. 6-11, 2014, Gold Coast, Queensland, Australia, Copyright 2014 ACM, pp. 839-842.

Shtok, et al., "Predicting Query Performance by Query-Drift Estimation", ICTIR 200 LNCS 5766, pp. 305-312, 2009, Copyright Springer-Verlag.

Song, et al., "Query Term Ranking based on Search Results Overlap", SIGIR '11, Jul. 24-28, 2011, Beijing, China, ACM, 2 pages.

Svore, et al., How Good is a Span of Terms? Exploiting Proximity to Improve Web Retrieval, SIGIR '10, Jul. 19-23, 2010, Geneva, Switzerland, Copyright 2010 ACM, 8 pages.

Zhou, et al., "Query Performance Prediction in Web Search Environments", printed Sep. 22, 2015, 9 pages.

He, et al., "Query Performance Prediction", Elsevier Science, May 30, 2005, 18 pages, <http://ir.dcs.ac.uk/smooth/ls-special-final.pdf>.

Kurland, et al., "Query-Performance Prediction and Cluster Ranking: Two Sides of the Same Coin", CIKM '12, Oct. 29-Nov. 2, 2012, Copyright 2012 ACM, 4 pages, <http://ie.technion.ac.il/~kurland/qppCluster.pdf>.

Ozdemiray, et al., "Query Performance Prediction for Aspect Weighting in Search Result Diversification", Proceeding CIKM '14 Proceedings of the 23rd ACM International Conference on Information and Knowledge Management, pp. 1871-1874, printed Jun. 25, 2015.

Perez-Iglesias, Joaquin, "Query Performance Prediction Based on Ranking List Dispersion", The 3rd BCS IRSG Symposium on Future Directions in Information Access, pp. 22-28, Sep. 9, 2009, <http://www.bcs.org/upload.pdf/ewic_fdia09_s1paper4.pdf>.

* cited by examiner

$$P_x^{Dir[\mu]}(w) \stackrel{def}{=} \frac{tf(w,x) + \mu \frac{tf(w,D)}{|D|}}{|x| + \mu}$$

FIG. 3

$$Score_q(d) \stackrel{def}{=} P_d^{Dir[\mu]}(q) \stackrel{def}{=} \log \prod_{q_i} P_d^{Dir[\mu]}(q_i)$$

FIG. 4

$$\varphi_q(w) \stackrel{def}{=} \frac{1}{1 + exp^{-\Delta P(w;q)}}$$

FIG. 5

$$Score_q^{TWQP}(d) \stackrel{def}{=} \sum_{w \in V} \varphi_q(w) \cdot \log(P_d^{[\mu]}(w))$$

GENERIC TERM WEIGHTING BASED ON QUERY PERFORMANCE PREDICTION

BACKGROUND

The present invention relates generally to querying, and more particularly to weighing terms for query performance predictions.

Information retrieval (IR) is the activity of obtaining information resources relevant to an information need from a collection of information resources. Searches can be based on metadata or on full-text (or other content-based) indexing.

Automated information retrieval systems are used to reduce what has been called "information overload." Many universities and public libraries use IR systems to provide access to books, journals and other documents. Web search engines are the most visible IR applications.

An information retrieval process begins when a user enters a query into the system. Queries are formal statements of information needs, for example search strings in web search engines. In information retrieval a query does not uniquely identify a single object in the collection. Instead, several objects may match the query, perhaps with different degrees of relevancy.

An object is an entity that is represented by information in a database. User queries are matched against the database information. Depending on the application the data objects may be, for example, text documents, images, audio, mind maps, or videos. Often the documents themselves are not kept or stored directly in the IR system, but are instead represented in the system by document surrogates or metadata.

Most IR systems compute a numeric score on how well each object in the database matches the query, and rank the objects according to this value. The top ranking objects are then shown to the user. The process may then be iterated if the user wishes to refine the query.

SUMMARY

Embodiments of the present invention disclose a method, computer program product, and system for weighing terms for query performance. In one embodiment, in accordance with the present invention, the computer-implemented method includes receiving, by one or more processors, an initial query term. The method further includes generating, by one or more processors, an expanded query based on the received initial query term and one or more related terms to the received initial query. The method further includes determining, by one or more processors, weights corresponding to terms in the received initial query term and the generated expanded query term based on a predicted effect on query performance. In some embodiments, the method includes performing, by one or more processors, a query utilizing the received initial query term and the corresponding determined weights of the terms in the received initial query term, and the weighted the generated expanded query and the corresponding determined weights of the terms in the generated expanded query. In some embodiments, the method further includes ranking, by one or more processors, results of the performed query.

DETAILED DESCRIPTION

Embodiments of the present invention present a generic query term weighting approach based on query performance prediction (QPP). To this end, a given term is weighed according to the terms predicted effect on query performance. Such an effect is assumed to be manifested in the responses made by the underline retrieval model for the initial query and the initial queries (simple) variants in the form of a single-term expanded query. The term weighting approach is further demonstrated to provide a more robust retrieval by improving the performance of a given relevance model used to derive the terms.

Implementation of embodiments of the invention may take a variety of forms, and exemplary implementation details are discussed subsequently with reference to the Figures.

Figure 1:
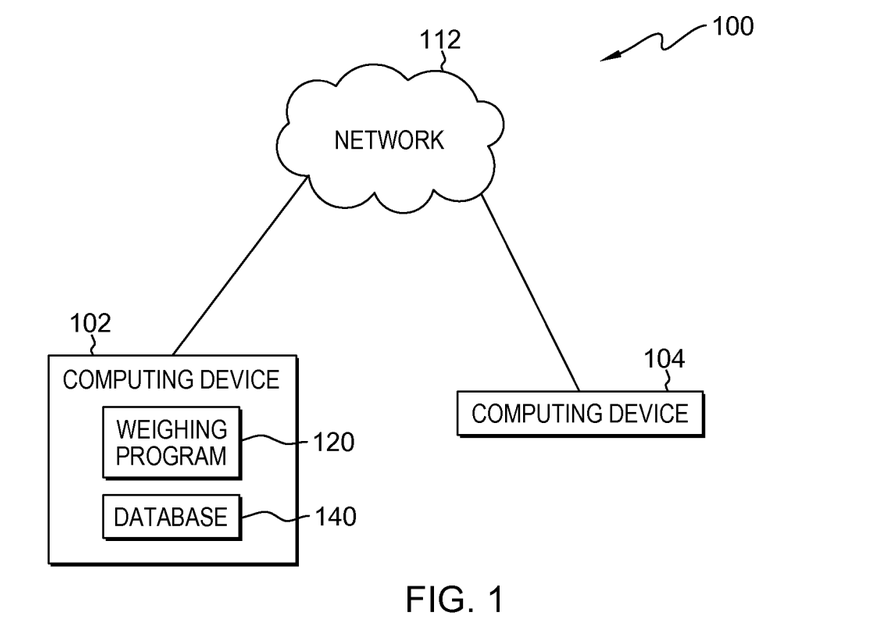
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 102 and computing device 104 connected over network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, computing device 102 represents a laptop computer, a tablet computer, a netbook computer, a personal computer (PC), a desktop computer, a personal digital assistant (PDA), a smart phone, or any programmable electronic device capable of communicating with network 112. In some embodiments, computing device 102 represents a server computing system utilizing multiple computers as a server system, such as in a cloud computing environment. In another embodiment, computing device 102 may be one or more of a management server, a web server, or any other electronic device or computing system capable of receiving, analyzing, and sending data. In another embodiment, computing device 102 represents a computing system utilizing clustered computers and components to act as a single pool of seamless resources. In this embodiment, computing device 102 weighs query terms. Computing device 102 may include components, as depicted and described in further detail with respect to FIG. 7, in accordance with embodiments of the present invention. Computing device 102 includes weighing program 120 and database 140.

In depicted distributed data processing environment 100, weighing program 120 resides on computing device 102 and weighs query terms. In various embodiments, weighing program 120 weighs a given term according to the predicted effect of the term on query performance. Such an effect is assumed to be manifested in the responses made by the underline retrieval model for the initial query and the initial queries simple variants. In some embodiments, weighing program 120 introduces query variants in the form of a single-term expanded query, intending to focus the initial query towards a specific "aspect." In an example, for a given term, weighing program 120 expands the query with that single term and resubmits the query to obtain the corresponding response. In various embodiments, weighing program 120 evaluates the quality of both result lists (i.e., the result list initially retrieved for the query and the result list retrieved for the queries single-term expanded version), the effect of the single term on the query's performance may be estimated.

In some embodiments, a post-retrieval QPP method, as known in the art, assumed to be provided as an input, serves as a proxy for estimating "before" and "after" effects on query performance. In some examples, weighing program 120 determines a query term's importance based upon the relative difference (e.g., positive, negative or none) in predicted query performance with respect to the initial query. Weighed terms may be extracted from any source (e.g., either considering the terms explicitly specified in the query or implicitly derived from explicitly specified terms). In some examples, weighing program 120 derives terms from the relevance model 3 (RM3) pseudo relevance model as known by one skilled in the art. Weighing program 120 is depicted and described in further detail with respect to FIG. 2.

In the depicted embodiment, database 140 resides on computing device 102. In another embodiment, database 140 may reside elsewhere in distributed data processing environment 100, such as within another computing device (not depicted) or independently as a standalone database that is capable of communicating with computing device 102 via network 112. A database is an organized collection of data. Database 140 is implemented with any type of storage device capable of storing data that is accessed and utilized by computing device 102, such as a database server, a hard disk drive, or a flash memory. In other embodiments, database 140 represents multiple storage devices within computing device 102. Database 140 stores retrieved documents from search result.

In the depicted environment, computing device 104 represents a laptop computer, a tablet computer, a netbook computer, a personal computer (PC), a desktop computer, a personal digital assistant (PDA), a smart phone, or any programmable electronic device capable of communicating with network 112. In some embodiments, computing device 104 represents a server computing system utilizing multiple computers as a server system, such as in a cloud computing environment. In another embodiment, computing device 102 may be one or more of a management server, a web server, or any other electronic device or computing system capable of receiving, analyzing, and sending data. In another embodiment, computing device 104 represents a computing system utilizing clustered computers and components to act as a single pool of seamless resources. In this embodiment, computing device 104 represents a possible host of information sought by weighing program 120 during a query. In some embodiments, computing device 104 may be an Internet server queried by other computing devices (e.g., computing device 102) during Information Retrieval (IR). Computing device 104 may include components, as depicted and described in further detail with respect to FIG. 7, in accordance with embodiments of the present invention.

Figure 2:
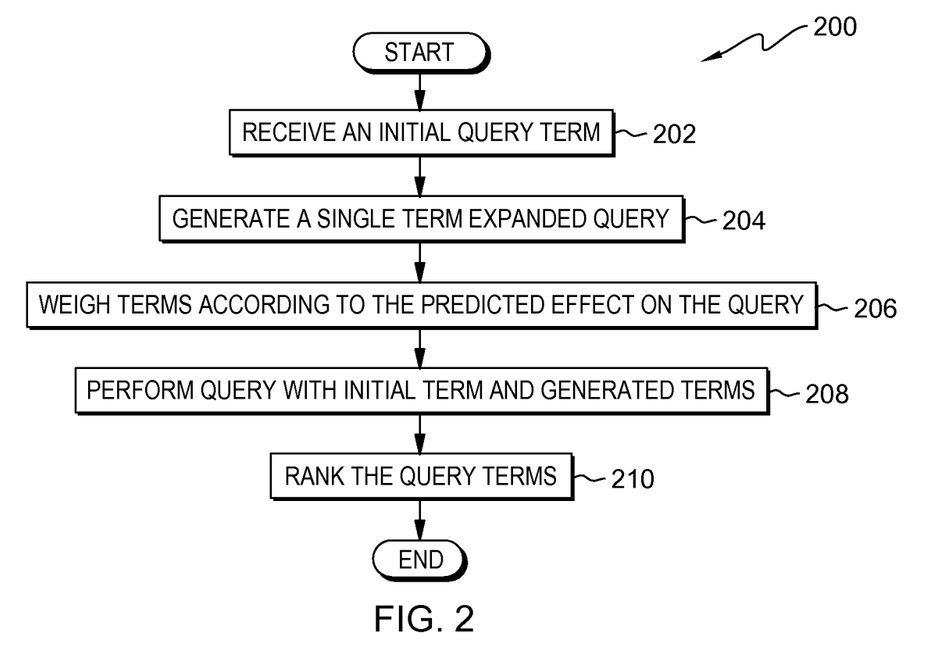
FIG. 2 is a flowchart depicting operational steps of a program for—within the distributed data processing environment of FIG. 1, in accordance with an embodiment of the present invention.

FIG. 2 is a flowchart depicting operational steps of program 200, which is a function of weighing program 120, in accordance with an embodiment of the present invention. Program 200 operates on computing device 102 and generates single term expanded queries and weighs the terms. In various embodiments, program 200 may initiate in response to receiving a prompt when a user to begin a query. In another embodiment, program 200 may begin the operation steps of program 200 after receiving a query term.

Program 200 receives an initial query term (step 202). In some embodiments, program 200 receives an initial query search term from a user of computing device 102. In other embodiments, program 200 may receive an initial query term from another computing device (not depicted) as part of an IR by a user of the other computing device.

Figure 3:
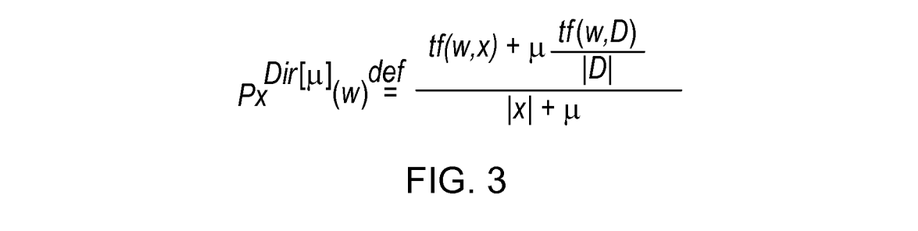
FIG. 3 depicts and equation for the Dirichlet smooth language model, in accordance with an embodiments of the present invention.
Figure 4:
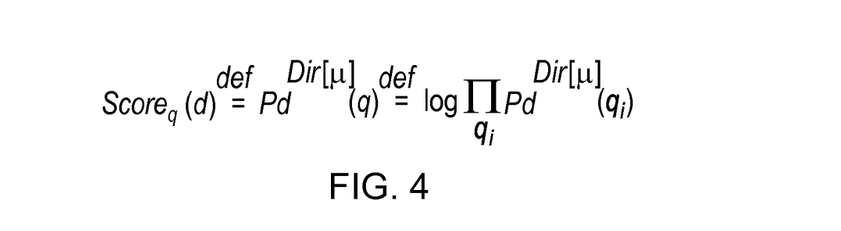
FIG. 4 depicts an equation for the retrieval scores of query-likelihood, in accordance with an embodiment of the present invention.

In various embodiments, program 200 may let q denote a query submitted over a corpus of documents 'D. Given query q, let $Score_q(d)$ denote the score of document d∈'D and let '$D^{[k]}_q$ D further denote a ranked list that contains the k highest scored documents according to $Score_q(d)$. In this work, the retrieval scores $Score_q(d)$ are calculated according to the query-likelihood model as follows. Let w be a term in the vocabulary V and $p_x^{Dir[\mu]}$ (w) be text x's Dirichlet smoothed language model with smoothing parameter μ, calculated as depicted in FIG. 3, where tf (w, •) and |•| denote the term frequency of term w and the overall term frequency (either in text x or the entire collection 'D), respectively. Let $\{q_i\}$ be the group of query terms, the query-likelihood of a document d∈'D is calculated in FIG. 4.

Program 200 generates a single term expanded query (step 204). For a given query q and a term w∈V, let q∨w denote the expansion of query q with w as a single additional disjunctive term. Such an expansion basically "shifts" the initial information need expressed in q towards a specific aspect w. Surely, for a given query q, not all terms w∈V may be related to q. Hence, an expansion of such terms may result in a query-drift, as known by one skilled in the art. To minimize query drift risk, terms w∈V considered for such an expansion should be carefully selected. In this work, therefore, only terms that explicitly appear in query q or are implicitly induced from query q (e.g., using a relevance model as known by one skilled in the art) are considered. Let $V_q$ denote the subset of terms in V considered for term weighting (i.e., terms in V\$V_q$ are ignored). In an example, q="Java™ programming" is the original query and term="JVM" is a single relevant term. An example single expanded query is "Java™ programming JVM". In some embodiments, program 200 identifies one or more terms that are related to the received in initial query term, wherein the identified one or more terms is a set of terms that are related to at least one term that is present in the received initial query term.

Program 200 weighs terms according to the predicted effect on the query (step 206). In some embodiments, program 200 weighs terms $w \in V_q$ according to the terms predicted effect on the performance of query q. While a term $w \in V_q$ may be relevant in some way to query q, $w \in V_q$ may still have a varying effect on the performance of query q. For example, a term w that is explicitly expressed in query q may not be well converged in the collection 'D as known by a person skilled in the art. As another example, a term w that was implicitly derived from query q (e.g., using a relevance model as known by a person of ordinary skill in the art) may still incur a risk by including term w as part of an expanded query due to possible query-drift as known by a person skilled in the art. Therefore, in some embodiments, program 200 can weigh terms $w \in V_q$ according to the term's potential to improve (or decline) query q's performance. In an example, a Lucene™ query syntax may be used to provide a query boost (e.g., Java™ ^0.2, programming ^0.5, JVM ^0.9). In another example, program 200 can utilize a log-linear scoring to weigh terms based on the predicted effect on the query. In some embodiments, program 200 determine weights corresponding to terms in the received initial query term and the generated expanded query term based on a predicted effect on query performance. In various embodiments, program 200 determines a potential to improve query performance associated with the terms in the generated expanded query term based on relationships to the received initial query term.

Figure 5:
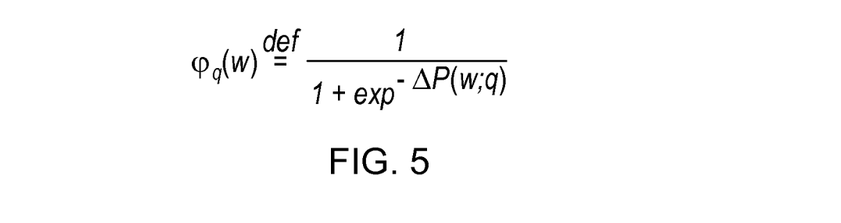
FIG. 5 depicts an equation for deriving the weight of a term, in accordance with an embodiment of the present invention.

Program 200 performs the query with initial terms and generated term (step 208). For a given query q and retrieved list $D^{[k]}_q$, let $P(D^{[k]}_q)$ now denote the predicted quality (a predictor quality is usually given in terms of correlation to average precession as known by a person of ordinary skill in the art) of $D^{[k]}_q$. $P(D^{[k]}_q)$ may be instantiated using various post-retrieval QPP methods. The relative influence of a term $w \in V_q$ on the performance of query q (as manifested in the retrieved list $D^{[k]}_q$) is estimated by further retrieving the list $D^{[k]}_q \vee_w (D)$. Let $P(D^{[k]}_q \vee_w)$ be the corresponding predicted quality of $D^{[k]}_q \vee_w$. Let $\Delta P(w; q) \stackrel{def}{=} P(D^{[k]}_q \vee_w) - P(D^{[k]}_q)$ denote the difference between the quality predicted for the original query q and the original query q single term expanded version q∨w. Finally, let $\varphi_q(w) \in [0, 1]$ now denote the weight assigned to term $w \in V_q$, derived in this work as FIG. 5. Therefore, according to FIG. 5, the larger the predicted improvement $\Delta P(w; q)$ for a given term $w \in V_q$ is, the higher will be the weight $\varphi_q(w)$ assigned to that term. In some embodiments, program 200 performs a query utilizing the received initial query term and the corresponding determined weights of the terms in the received initial query term, and the weighted the generated expanded query and the corresponding determined weights of the terms in the generated expanded query. In various embodiments, program 200 performs a query based on the ranking of potential query terms, wherein the performed query includes ranked potential query terms that are above a threshold.

Figure 6:
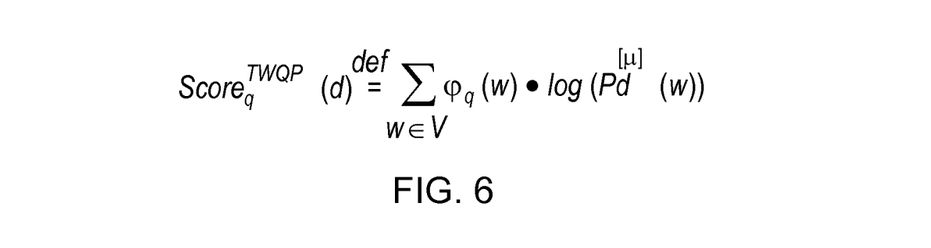
FIG. 6 depicts an equation for re-scoring a document based upon the derived weights, in accordance with an embodiment of the present invention.

Program 200 ranks query terms (step 210). In various embodiments, program 200 determines the ranking utilizing the sigmoid value (e.g., the weight $\varphi_q(w)$). In various embodiments, the proposed term weighting approach is evaluated using search re-ranking as the underlying application. An equation as depicted in FIG. 6 is utilized to perform the rankings. FIG. 6 depicts an equation for re-scoring a document (e.g., $d \in D^{[k]}_q$) based upon the derived weights (e.g., $\{\varphi_q(w)\} w \in V$). Documents initially retrieved in $D^{[k]}_q$ are, therefore, re-ranked according to $Score_q^{TWQP}(\cdot)$. In some embodiments, program 200 ranks potential query terms based on the determined weights corresponding to terms in the received initial query term and the generated expanded query term.

Figure 7:
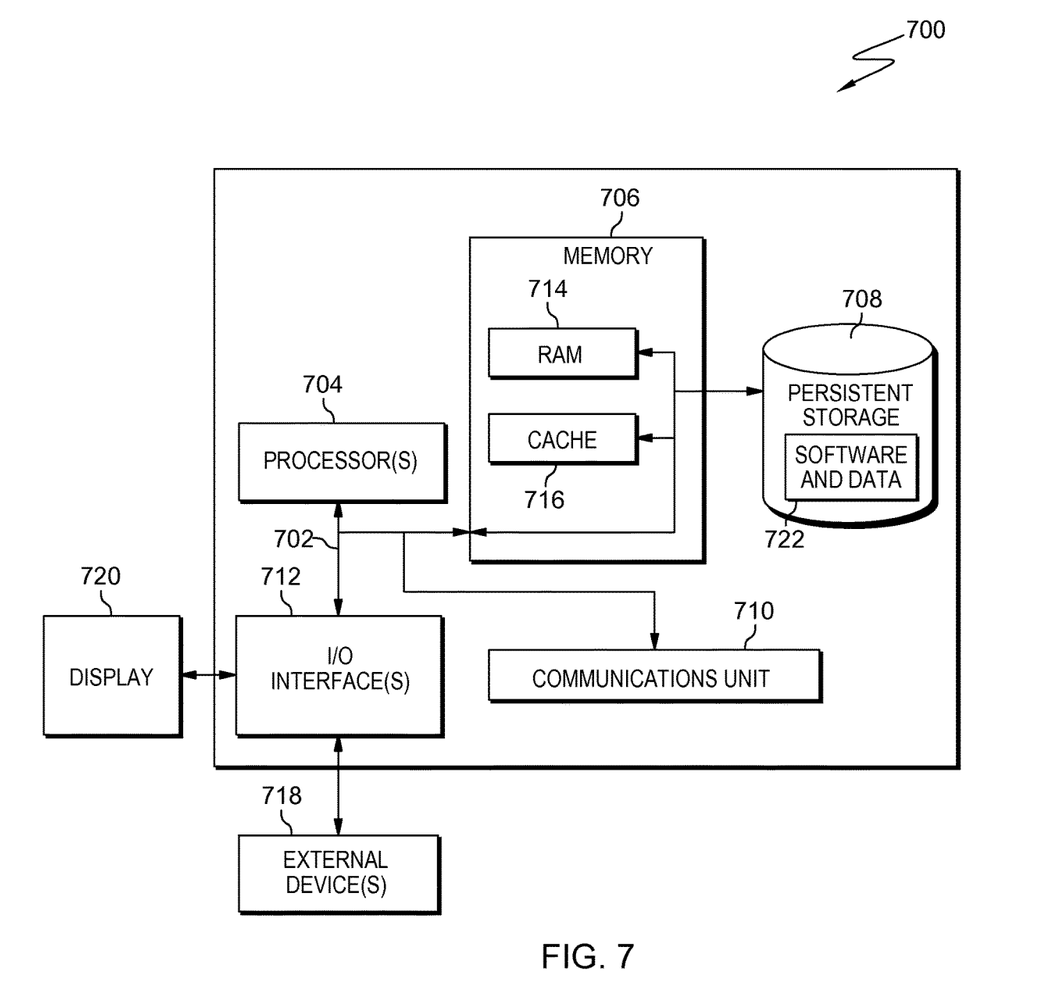
FIG. 7 depicts a block diagram of components of computing devices of FIG. 1, in accordance with an embodiment of the present invention.

FIG. 7 depicts a block diagram of components of computer 700, which is representative of computing device 102 and computing device 104, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 700 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications, and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 714 and cache 716. In general, memory 706 can include any suitable volatile or non-volatile computer readable storage media. Software and data 722 are stored in persistent storage 708 for access and/or execution by processor(s) 704 via one or more memories of memory 706. With respect to computing device 102, software and data 722 represents weighing program 120 and database 140.

In this embodiment, persistent storage 708 includes a magnetic hard disk drive. Alternatively, or in addition to a magnetic hard disk drive, persistent storage 708 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Software and data 722 may be downloaded to persistent storage 708 through communications unit 310.

I/O interface(s) 712 allows for input and output of data with other devices that may be connected to computer 700. For example, I/O interface(s) 712 may provide a connection to external device(s) 718, such as a keyboard, a keypad, a touch screen, and/or some other suitable input device. External device(s) 718 can also include portable computer readable storage media, such as, for example, thumb drives, portable optical or magnetic disks, and memory cards. Software and data 722 can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for weighing terms for query performance, the method comprising:
    receiving, by one or more processors, an initial query that includes a first term, wherein the initial query is of a corpus of documents;
    generating, by one or more processors, a single term expanded query based on the initial query and one or more related terms to the first term, wherein each of the one or more related terms are a single additional disjunctive term;
    determining, by one or more processors, weights with log linear scoring corresponding to terms in: (i) the initial query and (ii) the single term expanded query, the weights based on a predicted effect on query performance, wherein determining the weights comprises calculating a potential to improve query performance associated with the terms in the single term expanded query based on: relationships to the first term and convergence within the corpus of documents;
    ranking, by one or more processors, terms in both: (i) the initial query and (ii) the single term expanded query, collectively, based on the determined weights corresponding to the terms in: (i) the initial query and (ii) the single term expanded query; and
    performing, by one or more processors, a query based on the ranking of the terms in: (i) the initial query and (ii) the single term expanded query, wherein:
        the performed query only includes terms, in: (i) the initial query and (ii) the single term expanded query, that are ranked above a threshold; and
        at least one term from the single term expanded query is ranked above the threshold.

2. The method of claim 1, further comprising:
    performing, by one or more processors, a second query utilizing: (i) the initial query and the corresponding weights of the terms in the initial query, and (ii) the single term expanded query and the corresponding weights of the terms in the single term expanded query; and
    ranking, by one or more processors, results of the second query.

3. The method of claim 1, wherein generating the single term expanded query further comprises:
    identifying, by one or more processors, one or more terms that are related to the received in initial query, wherein the identified one or more terms is a set of terms that are related to the first term.

4. The method of claim 2, wherein ranking results of the second query further comprises:
    determining, by one or more processors, ranking for the terms in the single term expanded query based on query performance improvements corresponding to the terms in the single term expanded query relative to the terms in the received initial query; and
    ranking, by one or more processors, the terms in the single term expanded query.

5. The method of claim 1, further comprising:
    determining, by one or more processors, ranking for the terms in the single term expanded query that are utilized in the query based on query performance improvements corresponding to the terms in the single term expanded query relative to the terms in the received initial query; and
    ranking, by one or more processors, the terms in the single term expanded query.

6. A computer program product for weighing terms for query performance, the computer program product comprising:
    one or more computer readable storage media and program instructions stored on the one or more computer readable storage media, the program instructions comprising:
    program instructions to receive an initial query that includes a first term, wherein the initial query is of a corpus of documents;
    program instructions to generate a single term expanded query based on the initial query and one or more related terms to the first term, wherein each of the one or more related terms are a single additional disjunctive term;
    program instructions to determine weights with log linear scoring corresponding to terms in: (i) the initial query and the single term expanded query, the weights based on a predicted effect on query performance, wherein determining the weights comprises calculating a potential to improve query performance associated with the terms in the single term expanded query based on relationships to the first term and convergence within the corpus of documents;
    program instructions to rank terms in both: (i) the initial query and (ii) the single term expanded query, collectively, based on the determined weights corresponding to the terms in: (i) the initial query and (ii) the single term expanded query; and
    program instructions to perform a query based on the ranking of the terms in: (i) the initial query and (ii) the single term expanded query, wherein:
    the performed query only includes terms, in: (i) the initial query and (ii) the single term expanded query, that are ranked above a threshold; and
    at least one term from the single term expanded query is ranked above the threshold.

7. The computer program product of claim 6, further comprising program instructions to:
    perform a second query utilizing: (i) the initial query and the corresponding weights of the terms in the initial query, and (ii) the single term expanded query and the corresponding weights of the terms in the single term expanded query; and
    rank results of the second query.

8. The computer program product of claim 6, wherein program instructions to generate the single term expanded query further comprises program instructions to:
- identify one or more terms that are related to the received in initial query, wherein the identified one or more terms is a set of terms that are related to the first term.

9. The computer program product of claim 7, wherein program instructions to rank results of the second query further comprises program instructions to:
- determine ranking for the terms in the single term expanded query based on query performance improvements corresponding to the terms in the single term expanded query relative to the terms in the received initial query; and
- rank the terms in the single term expanded query.

10. The computer program product of claim 6, further comprising program instructions to:
- determine ranking for the terms in the single term expanded query that are utilized in the query based on query performance improvements corresponding to the terms in the single term expanded query relative to the terms in the received initial query; and
- rank the terms in the single term expanded query.

11. A computer system for weighing terms for query performance, the computer system comprising:
- one or more computer processors;
- one or more computer readable storage media;
- program instructions stored on the computer readable storage media for execution by at least one of the one or more computer processors, the program instructions comprising:
- program instructions to receive an initial query that includes a first term, wherein the initial query is of a corpus of documents;
- program instructions to generate a single term expanded query based on the initial query and one or more related terms to the first term, wherein each of the one or more related terms are a single additional disjunctive term;
- program instructions to determine weights with log linear scoring corresponding to terms in: (i) the initial query and the single term expanded query, the weights based on a predicted effect on query performance, wherein determining the weights comprises calculating a potential to improve query performance associated with the terms in the single term expanded query based on relationships to the first term and convergence within the corpus of documents;
- program instructions to rank terms in both: (i) the initial query and (ii) the single term expanded query, collectively, based on the determined weights corresponding to the terms in: (i) the initial query and (ii) the single term expanded query; and
- program instructions to perform a query based on the ranking of the terms in: (i) the initial query and (ii) the single term expanded query, wherein:
- the performed query only includes terms, in: (i) the initial query and (ii) the single term expanded query, that are ranked above a threshold; and
- at least one term from the single term expanded query is ranked above the threshold.

12. The computer system of claim 11, further comprising program instructions to:
- perform a second query utilizing: (i) the initial query and the corresponding weights of the terms in the initial query, and (ii) the single term expanded query and the corresponding weights of the terms in the single term expanded query; and
- rank results of the second query.

13. The computer system of claim 11, wherein program instructions to generate the single term expanded query further comprises program instructions to:
- identify one or more terms that are related to the received in initial query, wherein the identified one or more terms is a set of terms that are related to first term.

14. The computer system of claim 12, wherein program instructions to rank results of the second query further comprises program instructions to:
- determine ranking for the terms in the single term expanded query based on query performance improvements corresponding to the terms in the single term expanded query relative to the terms in the received initial query; and
- rank the terms in the single term expanded query.

15. The method of claim 1, wherein:
- the first term in the initial query is ranked below the threshold; and
- performing the query comprises performing the query without the first term.

* * * * *